Dec. 11, 1956     T. NORMANN     2,773,734
TIME RECORDING APPARATUS
Filed March 22, 1954
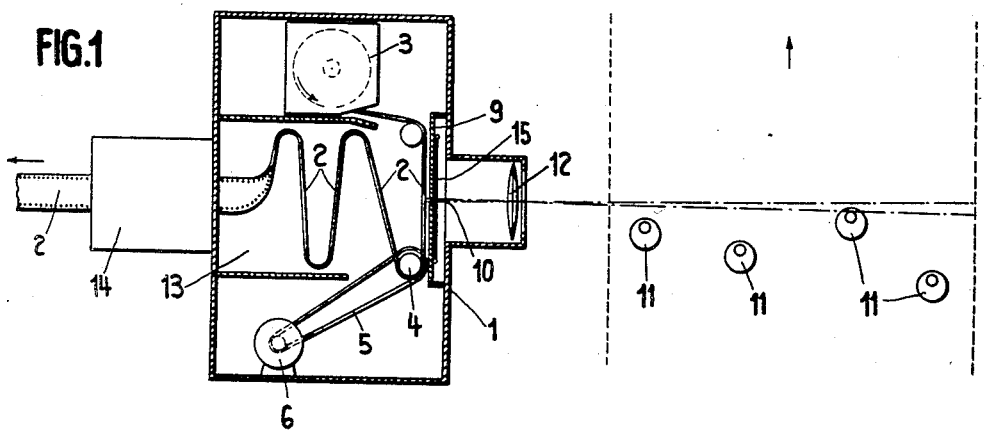
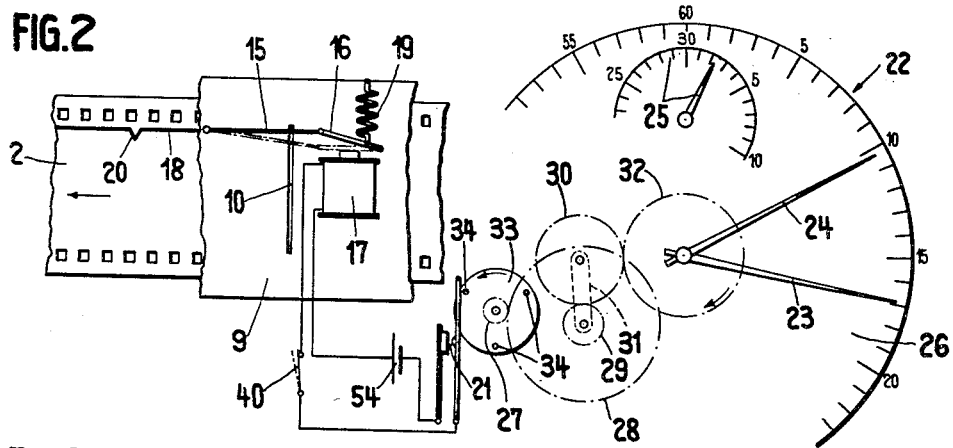
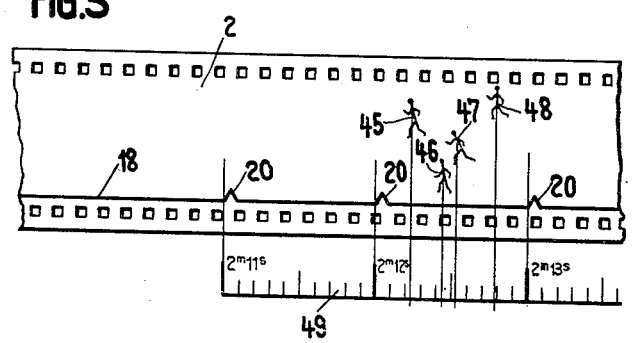
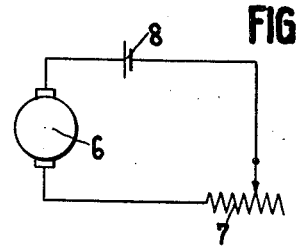
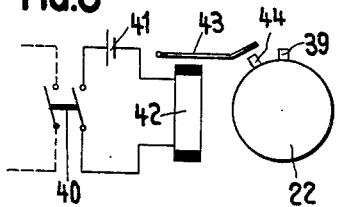
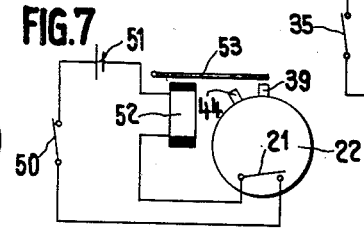
INVENTOR
TUROLF NORMANN
BY Edward F. Connors
ATTORNEY

United States Patent Office 2,773,734  
Patented Dec. 11, 1956

2,773,734

TIME RECORDING APPARATUS

Turolf Normann, Gjovik, Norway, assignor to Omega Louis Brandt & Frere S. A., Bienne, Switzerland Application March 22, 1954, Serial No. 417,798

Claims priority, application Switzerland April 10, 1953

5 Claims. (Cl. 346—107)

The present invention relates to a time recording apparatus, including a timepiece and a camera the film of which advances at a uniform movement adjustable in proportion to the speed of the objects to be observed in such a way that their image be clear in spite of their movement, the camera comprising means for photographing only a very short space extending on both sides of the line of observation, e. g. the finish line.

This apparatus is characterized in that the timepiece is arranged so as to provide periodic impulses to an electromagnet the armature of which in operation moves a member before the camera in such a way that the image of this member, formed of rectilinear segments and of projections, be impressed onto the rim of the film by the side of the image of the said objects, means being provided for identifying the time at which correspond the said projections produced on the film.

The accompanying drawing shows, by way of example, an embodiment of the invention. It is illustrated therein a particular application to the time-keeping of a sporting competition.

Fig. 1 is a plan view thereof.

Fig. 2 is an elevation view of same, at an enlarged scale.

Fig. 3 shows a portion of the developed film.

Figs. 4 to 7 show different electric control circuits.

The apparatus illustrated in Figs. 1 and 2 of the drawing comprises a camera 1 of the type in which the film 2 is moved continuously and uniformly. The unexposed film, contained in the magazine 3, is driven by means of a claw drum 4 which is connected by a transmission 5 with an electric motor 6. An electric device allows varying the speed of the motor 6. This variation is obtained by means of an adjustable resistance 7 which lowers more or less the tension of the battery 8. The resistance 7 is directly graduated in meters/minute.

The camera 1 presents a screen 9 provided with a slot 10 allowing localizing the photograph to and around the line of observation (for instance the finish line) of the racers 11 (Fig. 1). This screen 9 lies between the film 2 and the optical part 12 of the camera 1. By suitably regulating the speed of the motor 6, it is possible to cause the film 2 to follow at a mean velocity the image received from the racers 11. The reproduction obtained on the film 2 represents the progressive passage of the racers 11 on the line of observation and finally gives an image of the order of the arrivals. Once exposed, the film 2 traverses a chamber 13 where it has the possibility of accumulating before passing into the box 14 containing the developing and fixing baths.

The left portion of Fig. 2 shows more clearly the screen 9 with its slot 10 (Fig. 2 represents the camera 1 seen from the right in Fig. 1, the objective 12 being removed). A wire 15 is stretched horizontally in front of the slot 10; one of its ends is attached to the screen 9, whereas the other is fixed to the armature 16 of an electromagnet 17 connected to a battery 54. The wire 15 produces on the rim of the film 2, as the latter passes behind the slot 10, a continuous line of shadow 18 (Figs. 2 and 3). If a current impulse is sent into the electromagnet 17, its armature 16 will be attracted, thus driving the wire 15, and then is brought back under the action of a restoring spring 19 as soon as the current is switched off. The spring 19 is fixed at one of its ends to the armature 16 and at the other to the screen 9. The displacement of the wire 15 will be expressed on the film 2 by a projection 20 interrupting the continuity of the line 18. The shape of this projection 20 will depend upon the duration of the electric impulse passing through the electromagnet 17; the shorter this impulse, the more pointed the projection 20. If this electric impulse is controlled by a contact 21 closed once a second, there will be between each pair of projections 20 an interval corresponding to one second (Fig. 3). The said contact 21 is closed by means of a chronograph 22 partially shown in the right portion of Fig. 2.

The chronograph 22 is a split-second recording chronograph. Therefore, it has two second hands 23 and 24 which, when starting, run above each other. The hand 24 is a fly-back hand which can be stopped in any point and then fly back to overtake the first hand 23 (sweep second hand). The chronograph 22 has a minute-recorder 25. For the sake of simplification the tenths of a second are not indicated in Fig. 2 on the dial 26 of the chronograph 22.

The chronograph 22 is of a conventional type and will therefore not be described in detail. Its escape wheel pinion 27 is driven by a wheel 28 belonging to the normal train of wheels of the chronograph. The wheel 28 is rigidly fixed to a pinion 29 permanently meshing with an intermediate wheel 30 pivoting on a rocking bar 31 which is rotatably mounted on the shaft of the wheel 28. In the position shown in Fig. 2 (running chronograph), the rocking bar 31 has such a position that the intermediate wheel 30 engages the chronograph runner 32 carrying the sweep second hand 23. On the shaft of the escape wheel pinion 27 is fixed a wheel 33 carrying three pins 34 adapted to periodically close the contact 21. The gearing is chosen so as to cause the wheel 33 to rotate at a speed of ⅓ revolution per second, so that the contact 21 is closed at each second. The number of the pins 34 might be different from three; if the wheel 33 makes one revolution in $n$ seconds, $n$ pins should be fixed thereto so as to have always one contact closed per second.

The apparatus as described and illustrated works as follows:

Let us assume an athletic competition, the starting signal being given by means of a starting pistol the trigger of which electrically releases the mechanism of the chronograph 22. For this purpose, the pistol is equipped with a contact 35 (Fig. 5) connected to the time recording apparatus arranged near the finish line. On the discharge of the pistol, the contact 35 closes the circuit between a battery 36 and an electromagnet 37. The latter, being energized, attracts the armature 38 which presses the pusher 39 of the chronograph 22 and thus releases the mechanism of the same. Both hands 23 and 24 begin to rotate together and at each revolution cause the hand of the minute-recorder 25 to be advanced by one division. Before the arrival of the racers 11 on the finish line, the motor 6 is started (Figs. 1 and 4) and the film 2 begins to pass behind the slot 10 at the speed previously adjusted. For the moment, the interrupter 40 being open, the contact 21 which is closed at each second will have no action on the circuit of the electromagnet 17, and the unmoved wire 15 only produces the rectilinear line 18 (Figs. 2 and 3). When the first racer arrives at a distance of about twenty meters of the finish line, the interrupter 40 is closed by hand (Figs. 2 and 6), thus simultaneously stopping the fly-back hand 24. The interrupter 40 is indeed of a type controlling two circuits; it closes on the one hand the circuit of the electromagnet 17 (Fig. 2 and left portion of Fig. 6) and, on the other hand, a second circuit (right portion of Fig. 6) analogous to that of Fig. 5, comprising a battery 41 and an electromagnet 42, but the armature 43 of the latter now actuates the pusher 44 controlling the flyback hand 24 of the chronograph 22. The interrupter 40 thus has two functions: (a) it enables the wire 15 (Fig. 2) to be attracted every second by means of the electromagnet 17; (b) it stops the fly-back hand 24.

Let us take as an example the values indicated on Fig. 2, viz. the fly-back hand 24 stopped somewhat after the division 10 seconds. When the sweep second hand 23 arrives on the division 11 seconds, one of the pins 34 closes the contact 21 and the wire 15 moves downward with the armature 16 of the electromagnet 17. The first projection 20 is thus obtained on the film 2 (Fig. 3), corresponding to the time "2 minutes 11 seconds," that is to the second following the stopping of the fly-back hand 24. The hand 24 should preferably be stopped between two seconds so as to obtain an unambiguous identification of the time corresponding to the first projection 20. As long as the fly-back hand 24 is stopped, every second will be signalled by a projection 20 on the film 2.

If the first racer 11 passes through the finish line just after the second 12, his image will appear as at 45 on the film 2 (Fig. 3). The following racers, when passing through the finish line, are signalled as at 46, 47, 48, etc. When the race is over and the film 2 is developed, the film is fixed on a sheet of paper and the scale 49 shown in Fig. 3 is constructed, the space lying between two projections 20 being subdivided into ten equal parts. It suffices to draw a transverse line on the film 2 from the racers' chest onwards—in accordance with the international sporting prescriptions—in order to read the corresponding exact time on the scale 49. In the case of horse-races the line will be drawn from the snout of the horses and the same principle will be used in other cases according to the rules prescribed for each kind of race. If desired, the film 2 can be enlarged and the scale 49 can be subdivided into divisions of hundredths of a second.

For bringing the hands 23 and 24 back to zero, the two pushers 39 and 44 are successively pressed by hand, but beforehand a stop switch 50 of a circuit shown in Fig. 7 has to be closed. This circuit comprises a battery 51 and an electromagnet 52 connected in series to the contact 21. The electromagnet 52 is energized only when the contact 21 is closed and this occurs every second, as explained above. At this moment, the armature 53 is attracted and presses down the pusher 39, thus stopping the sweep second hand 23 exactly on one second division. Therefore, the pins 34 are always brought back with security in the correct starting position for a new cycle of operations. Lowering of the pusher 39 acts on the rocking bar 31 and disengages the intermediate wheel 30 from the chronograph runner 32. Upon resetting the hands 23 and 24 to zero, the runner 32 can, therefore, rotate without affecting the position of the pin-holder wheel 33. The apparatus is now ready for a new use.

Instead of being used for recording the time of sporting competitions, the apparatus according to the invention permits as well recording the time of any phenomenon. It can be used, for instance, for studying the movement of a body going at full speed, such as an airplane or a projectile.

While a representative embodiment has been shown for the purpose of illustrating the invention, it will be apparent to those skilled in the art that various changes and modifications may be made therein without departing from the spirit or scope of the invention.

What I claim is:

1. A precision photographic time recording device accurate to one-tenth of a second comprising a camera adapted to receive a strip of film, film advancing means for the camera, start and stop means for the film advancing means, shadow producing means adapted to produce a shadow line formed of collinear straight line segments separated by projections for providing indications of timed intervals on film in the camera, including an electromagnet, an armature for the electromagnet, a stretched wire having one end attached to the armature, slotted means interposed between the wire and the film, chronograph time indicating means, a flyback hand and a sweep second hand for the chronograph, electrically operated start and stop means for the chronograph, electrically operated stop means for the flyback hand, a geared wheel for the chronograph, at least one pin on the geared wheel, first intermittent electric contact making means actuable by the pin on the wheel of the chronograph for controlling the electromagnet of the shadow producing means, second intermittent electric contact means actuable by the pin on the wheel of the chronograph for controlling the starting position of the first intermittent contact making means, the electrically operated starting means operable to start the chronograph at the beginning of the timed interval and the film advancing means manually started thereafter, double contact switch means including first and second contacts, the first contact of the double contact switch energizing the shadow producing electromagnet circuit, the second contact of the double contact switch energizing the flyback stop means, whereby the elapsed time is given by the combined reading of the chronograph and the projections of the shadow line on the film, the double contact switch stopping the flyback hand and simultaneously starting the shadow producing means for the indication on the film.

2. A precision photographic time recording device accurate to one-tenth of a second comprising a camera adapted to receive a strip of film, film advancing means for the camera, start and stop means for the film advancing means, shadow producing means adapted to produce a shadow line on the film formed of collinear straight line segments separated by projections for providing indications of timed intervals on the film in the camera and including an electromagnet, an armature for the electromagnet, a stretched wire having one end attached to the armature, slotted means interposed between the wire and the film, chronograph time indicating means, a flyback hand and a sweep second hand for the cronograph, electrically operated start and stop means for the chronograph, electrically operated stop means for the flyback hand, first intermittent electric contact making means actuable by the chronograph for controlling the electromagnet of the shadow producing means, second intermittent electric contact means actuable by the chronograph for controlling the starting position of the first intermittent contact making means, the electrically operated starting means operable to start the chronograph at the beginning of the timed interval and the film advancing means manually started thereafter, double contact switch means including first and second contacts, the first contact of the double contact switch energizing the shadow producing electromagnet circuit, the second contact of the double contact switch energizing the flyback stop means, whereby the elapsed time is given by a combined reading of the chronograph and the projections of the shadow line on the film, the double contact switch stopping the flyback hand and simultaneously starting the shadow producing means for the indication on the film.

3. A precision photographic time recording device accurate to one-tenth of a second comprising a camera adapted to receive a strip of film, film advancing means for the camera, start and stop means for the film advancing means, shadow producing means adapted to produce a shadow line on the film formed of collinear straight line segments separated by projections for providing indications of timed intervals on the film in the camera and including an electromagnet, an armature for the electromagnet, a stretched wire having one end attached to the armature, slotted means interposed between the wire and the film, chronograph time indicating means, a flyback hand and a sweep second hand for the chronograph, electrically operated start and stop means for the chronograph, electrically operated stop means for the flyback hand, intermittent electric contact making means actuable by the chronograph for controlling the electromagnet of the shadow producing means, the electrically operated starting means operable to start the chronograph at the beginning of the timed interval and the film advancing means manually started thereafter, the intermittent electric contact making means energizing the shadow producing electromagnet circuit whereby the elapsed time is given by a combined reading of the chronograph and the projections of the shadow line on the film.

4. A precision photographic time recording device accurate to one-tenth of a second comprising a camera adapted to receive a strip of film, film advancing means for the camera, start and stop means for the film advancing means, shadow producing means adapted to produce a shadow line on the film, chronograph time indicating means, a flyback hand and a sweep second hand for the chronograph, electrically operated start and stop means for the chronograph, electrically operated stop means for the flyback hand, first intermittent electric contact making means actuable by the chronograph for controlling the electromagnet of the shadow producing means, second intermittent electric contact means actuable by the chronograph for controlling the starting position of the first intermittent contact making means, the electrically operated starting means operable to start the chronograph at the beginning of the timed interval and the film advancing means manually started thereafter, double contact switch means including first and second contacts, the first contact of the double contact switch energizing the shadow producing electromagnet circuit, the second contact of the double contact switch energizing the flyback stop means, whereby the elapsed time is given by a combined reading of the chronograph and the projections of the shadow line on the film, the double contact switch stopping the flyback hand and simultaneously starting the shadow producing means for the indication on the film.

5. A precision photographic time recording device accurate to one-tenth of a second comprising a camera adapted to receive a strip of film, shadow producing means adapted to produce a shadow line for providing indications of timed intervals on the film, chronograph time indicating means, a fly back hand and a sweep second hand for the chronograph, start and stop means for the chronograph, stop means for the flyback hand, and intermittent electric contact making means actuable by the chronograph for controlling the shadow producing means, the chronograph adapted to be set into operation at the beginning of the timed interval by its start means, the flyback stop means actuated to indicate the starting time for the time indications on the film, whereby the elapsed time is given by a combined reading of the chronograph and the projections of the shadow line on the film.

References Cited in the file of this patent
UNITED STATES PATENTS

| 2,354,836 | Rusch | Aug. 1, 1944 |
| 2,617,703 | Minkler | Nov. 11, 1952 |

FOREIGN PATENTS

| 245,410 | Switzerland | Nov. 15, 1946 |
| 672,967 | Great Britain | May 28, 1952 |